United States Patent
Bulgrien

(10) Patent No.: US 10,047,807 B2
(45) Date of Patent: Aug. 14, 2018

(54) CLUTCH CONTROL FOR VEHICLE TRANSMISSION

(71) Applicant: CNH Industrial America LLC, New Holland, PA (US)

(72) Inventor: Garth Harvey Bulgrien, Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 268 days.

(21) Appl. No.: 15/002,128

(22) Filed: Jan. 20, 2016

(65) Prior Publication Data

US 2017/0204918 A1    Jul. 20, 2017

(51) Int. Cl.
*F16D 48/06* (2006.01)

(52) U.S. Cl.
CPC ........ *F16D 48/06* (2013.01); *F16D 2500/102* (2013.01); *F16D 2500/10412* (2013.01); *F16D 2500/30412* (2013.01); *F16D 2500/30421* (2013.01); *F16D 2500/30806* (2013.01); *F16D 2500/30814* (2013.01); *F16D 2500/30822* (2013.01); *F16D 2500/50284* (2013.01); *F16D 2500/50287* (2013.01)

(58) Field of Classification Search
None
See application file for complete search history.

(56) References Cited

U.S. PATENT DOCUMENTS

| | | | |
|---|---|---|---|
| 5,769,753 A | 6/1998 | Kusafuka et al. | |
| 5,908,370 A | 6/1999 | Kubo et al. | |
| 6,450,309 B1 | 9/2002 | Hirai et al. | |
| 7,171,867 B2 | 2/2007 | McCrary et al. | |
| 7,488,272 B2 | 2/2009 | Bothe et al. | |
| 7,666,113 B2 | 2/2010 | Honma et al. | |
| 7,833,127 B2 | 11/2010 | Petzold et al. | |
| 7,962,267 B2 | 6/2011 | Honma et al. | |
| 8,079,936 B2 | 12/2011 | MacFarlane et al. | |
| 8,478,497 B2 | 7/2013 | Kato et al. | |

(Continued)

FOREIGN PATENT DOCUMENTS

DE    102011084621 A1    4/2013

OTHER PUBLICATIONS

Grad, Karl, ZF Solutions for Efficient CVT and Powershift Transmissions; ZF Friedrichshafen AG; Dec. 11, 2013.

*Primary Examiner* — Justin Holmes
(74) *Attorney, Agent, or Firm* — Rickard K. DeMille; Rebecca K. Henkel

(57) ABSTRACT

A method includes determining, via a processor, a speed ratio of a transmission system including a transmission based at least in part on an output speed of the transmission system and an input speed of the transmission system; determining, via the processor, a first torque percentage for a first clutch coupled to the transmission based at least in part on the speed ratio; determining, via the processor, a second torque percentage for a second clutch coupled to the transmission based at least in part on the speed ratio; outputting, via the processor, a signal indicative of a first torque command to a clutch assembly based at least in part on the first torque percentage; and outputting, via the processor, a signal indicative of a second torque command to the clutch assembly based at least in part on the second torque percentage.

18 Claims, 6 Drawing Sheets

(56) References Cited

U.S. PATENT DOCUMENTS

2006/0236798 A1* 10/2006 Krauss .................. F16D 48/08
                                                             74/325
2007/0167284 A1   7/2007 Steinhauser et al.
2013/0081491 A1   4/2013 Arai
2013/0245901 A1*  9/2013 Arai .................... F16H 61/688
                                                             701/51

* cited by examiner

| SELECTED GEAR RATIO | CLUTCH 1 | CLUTCH 2 | 1 | 2 | 3 | 4 | 5 | 6 | 7 | 8 |
|---|---|---|---|---|---|---|---|---|---|---|
| 1 | MAIN | HELPER | MAIN | HELPER | | | | | | |
| 2 | HELPER | MAIN | HELPER | MAIN | | | | | | |
| 3 | MAIN | HELPER | | HELPER | MAIN | | | | | |
| 4 | HELPER | MAIN | | | HELPER | MAIN | | | | |
| 5 | MAIN | HELPER | | | | HELPER | MAIN | | | |
| 6 | HELPER | MAIN | | | | | HELPER | MAIN | | |
| 7 | MAIN | HELPER | | | | | | HELPER | MAIN | |
| 8 | HELPER | MAIN | | | | | | | HELPER | MAIN |

FIG. 3

CLUTCH CONTROL FOR VEHICLE TRANSMISSION

BACKGROUND

The present disclosure relates generally to a clutch control for a transmission of a vehicle, such as a tractor. Typically, tractors with transmissions having discrete gears (i.e., tractors without continuously variable transmissions (CVTs)) utilize one or more clutches to engage certain gears for inching (i.e., short thrusts of motion at reduced power) and take-off (i.e., initiating movement from a stop). For such tractors, as a clutch engages, two or more elements of the clutch come into contact with one another. Initially, the two or more elements may slip and dissipate power. As the power of the tractors increase, more power may be dissipated by the clutch. Accordingly, the clutch may include one or more friction plates with large surface areas such that the clutch may dissipate the power. Increasing the size of the friction plate(s), and thus the clutch, may result in a larger, more costly transmission package. A large clutch also tends to cause higher parasitic losses due to increased clutch drag.

BRIEF DESCRIPTION

Certain embodiments commensurate in scope with the present disclosure are summarized below. These embodiments are not intended to limit the scope of the disclosure, but rather these embodiments are intended only to provide a brief summary of possible forms of the disclosure. Indeed, the disclosure may encompass a variety of forms that may be similar to or different from the embodiments set forth below.

In a first embodiment, a method includes determining, via a processor, a speed ratio of a transmission system including a transmission based at least in part on an output speed of the transmission system and an input speed of the transmission system. The method also includes determining, via the processor, a first torque percentage for a first clutch coupled to the transmission based at least in part on the speed ratio. The method further includes determining, via the processor, a second torque percentage for a second clutch coupled to the transmission based at least in part on the speed ratio. The method also includes outputting, via the processor, a signal indicative of a first torque command to a clutch assembly based at least in part on the first torque percentage. The method further includes outputting, via the processor, a signal indicative of a second torque command to a clutch assembly based at least in part on the second torque percentage.

In a second embodiment, a system for controlling a transmission system, includes a controller configured to control a first torque through a first clutch coupled to a transmission and a second torque through a second clutch coupled to the transmission. The controller is configured to control the first torque and the second torque such that a first power dissipation of the first clutch is approximately equal to a second power dissipation of the second clutch when a speed ratio is zero, wherein the speed ratio includes a ratio of a measured ratio of a speed of an output shaft of the transmission to a speed of an input shaft of the transmission to a determined ratio of the speed of the output shaft of the transmission to the speed of the input shaft of the transmission when the first clutch is fully engaged. The controller is also configured to adjust the first torque and the second torque based at least in part on the speed ratio as the first slippage of the first clutch and the second slippage of the second clutch changes.

In a third embodiment, a transmission system includes a transmission, a clutch assembly coupled to the transmission, wherein the clutch assembly includes a main clutch and a helper clutch, and a controller communicatively coupled to the main clutch and to the helper clutch. The controller is configured to determine a speed ratio that includes a ratio of a measured ratio of a speed of an output shaft of the transmission to a speed of an input shaft of the transmission to a determined ratio of the speed of the output shaft of the transmission to the speed of the input shaft of the transmission when the main clutch is fully engaged, determine a first torque percentage for the main clutch based at least in part on the speed ratio, and determine a second torque percentage for the helper clutch based at least in part on the speed ratio. The controller is also configured to determine a first torque command based at least in part on the first torque percentage and determine a second torque command based at least in part on the second torque percentage. The controller is further configured to control a first torque through the main clutch of the clutch assembly based at least in part on the first torque command and control a second torque through the helper clutch of the clutch assembly based at least in part on the second torque command.

DRAWINGS

These and other features, aspects, and advantages of the present invention will become better understood when the following detailed description is read with reference to the accompanying drawings in which like characters represent like parts throughout the drawings, wherein:

FIG. 3 is a chart of torque paths of a transmission system in accordance with an embodiment of the present disclosure;

DETAILED DESCRIPTION

Figure 1:
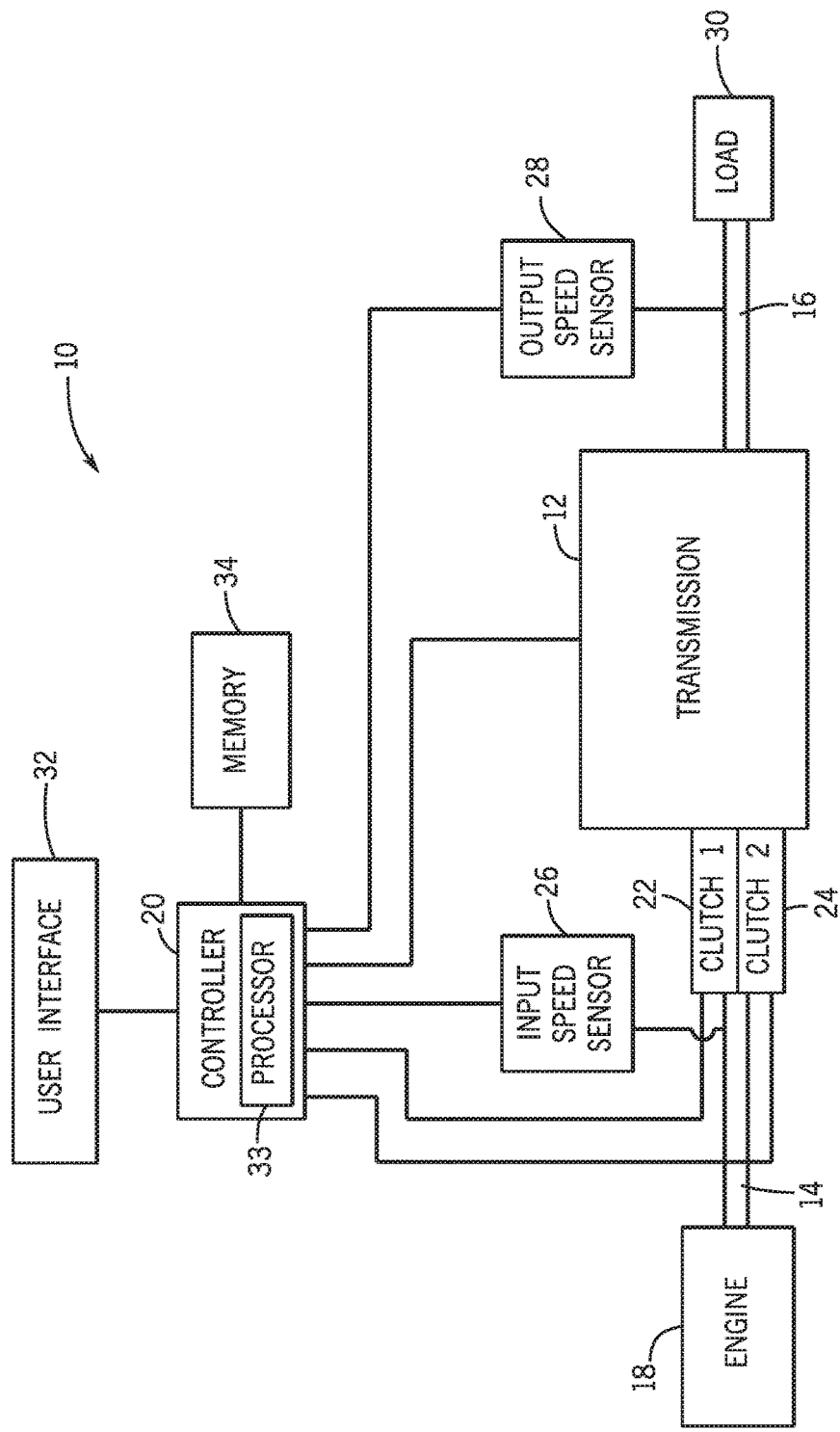
FIG. 1 is a block diagram of a transmission system for a vehicle in accordance with an embodiment of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The embodiments disclosed herein relate generally to a transmission control system for a transmission of a vehicle, such as a tractor. More particularly, systems and methods are disclosed herein, in which two clutches of the transmission are controlled by the transmission control system to reduce power dissipated by at least one of the clutches. Typically, tractors with transmissions having discrete gears (i.e., without continuously variable transmissions (CVTs)) utilize one or more clutches to engage certain gears for inching (i.e., short thrusts of motion at reduced power) and take-off (i.e., initiating movement from a stop), wherein the one or more clutches are part of a multi-clutch transmission system of the tractor. For such a tractor, as a clutch engages, two or more elements of the clutch (e.g., at least one of the elements being a friction plate) come into contact with one another. Initially, the two or more elements may slip and dissipate power. As the power of the tractor increases, more power may be dissipated by the clutch. Accordingly, the clutch may include one or more friction plates with large surface areas such that the clutch may dissipate the power. Increasing the size of the friction plate(s), and thus the clutch, may result in a larger, more costly transmission package. A large clutch also tends to cause higher parasitic losses due to increased clutch drag.

Certain tractors may use two clutches of the transmission in parallel torque paths for inching and take-off, such that power dissipation may be shared by the two clutches. As a result, peak power dissipation may be reduced, as compared to using a single clutch. Advantageously, the two clutches may each be smaller than a single clutch used for inching and take-off. In using two clutches, methods and techniques may be used to transition from slipping the two clutches to locking one of the clutches and releasing the other clutch. Torque delivered by the two clutches may be controlled. In particular, the torque may be controlled so as to split the power dissipation approximately equally between the two clutches. As the two clutches approach lock-up, the torque balance between the two clutches may be modified based on a ratio of transmission input and output speeds. Advantageously, using smaller clutches enables dissipating a large amount of power, a more streamlined transmission package, and increased torque capacity.

With the foregoing in mind, FIG. 1 is a block diagram of a transmission system 10 for a vehicle, such as a tractor, in accordance with an embodiment of the present disclosure. The transmission system 10 includes a transmission 12 that transmits power from a power input shaft 14 to a power output shaft (e.g., vehicle drive shaft) 16. An engine 18 may be coupled to the power input shaft 14 to provide power to rotate the power input shaft 14. In the illustrated embodiments, the transmission 12 is communicatively coupled to a transmission control system or controller 20, and mechanically coupled to a first clutch 22 and a second clutch 24. The controller 20 may send signals to control the transmission 12, the first clutch 22, the second clutch 24, or a combination thereof. The controller 20 may control the first clutch 22 and the second clutch 24 to engage gears of the transmission 12, such that a direction and a rotation speed of the power output shaft 16 is controlled.

An input speed sensor 26 may be a speed sensor that determines a speed of the power input shaft 14. For example, the input speed sensor 26 may be coupled to the power input shaft 14 and determine a rotation speed of the power input shaft 14. In some embodiments, the input speed sensor 26 may be coupled to the engine 18 and configured to determine a speed of the engine 18. In some embodiments, an engine controller communicatively coupled to the engine 18 may transmit the speed of the engine 18. In the illustrated embodiment, the controller 20 is coupled to the input speed sensor 26 and receives the speed of the power input shaft 14. An output speed sensor 28 may be a speed sensor that determines a speed of the power output shaft 16. For example, the output speed sensor 28 may be coupled to the power output shaft 16 and determine a rotation speed of the power output shaft 16. In some embodiments, the output speed sensor 28 may be coupled to an intermediate portion of the transmission 12 and determine a speed of the intermediate portion (e.g., an intermediate speed within the transmission 12). In the illustrated embodiment, the controller 20 is coupled to the output speed sensor 28 and receives the speed of the power output shaft 16.

The power output shaft 16 is coupled to a load 30, such as one or more drive wheels of the vehicle. The controller 20 is communicatively coupled to a user interface 32, which may include input devices (e.g., driver-actuated shift controls, clutch pedals, etc.) and output devices (e.g., indicators that provide vehicle information to the operator). In particular, inputs into the user interface 32 may be communicated to the controller 20 for controlling the clutches 22, 24. For example, the operator of the vehicle may shift between two gears by using the user interface 32 (e.g., using the driver-actuated shift controls) such that one or more of the clutches 22, 24 may disengage and/or engage to facilitate shifting gears of the transmission 12. The controller 20 includes a processor 33 (e.g., a microprocessor) that may execute software, such as software for controlling the vehicle. Moreover, the processor 33 may include multiple microprocessors, one or more "general-purpose" microprocessors, one or more special-purpose microprocessors, and/or one or more application specific integrated circuits (ASICS), or some combination thereof. For example, the processor 33 may include one or more reduced instruction set (RISC) processors.

In the illustrated embodiments, the controller 20 is communicatively coupled to a memory device 34 that may store information such as controller programs, look up tables, configuration data, etc. In some embodiments, the memory device 34 may be internal to (i.e., a component of) the controller 20. The memory device 34 may include a volatile memory, such as random access memory (RAM), and/or a nonvolatile memory, such as ROM. The memory device 34 may store a variety of information and may be used for various purposes. For example, the memory device 34 may store processor-executable instructions (e.g., firmware or software) for the processor 33 execute, such as instructions for controlling the vehicle. The storage device(s) (e.g., nonvolatile storage) may include read-only memory (ROM), flash memory, a hard drive, or any other suitable optical, magnetic, or solid-state storage medium, or a combination thereof. The storage device(s) may store data (e.g., position data, identification data, etc.), instructions (e.g., software or firmware for controlling the haul vehicle, etc.), and any other suitable data.

Figure 2:
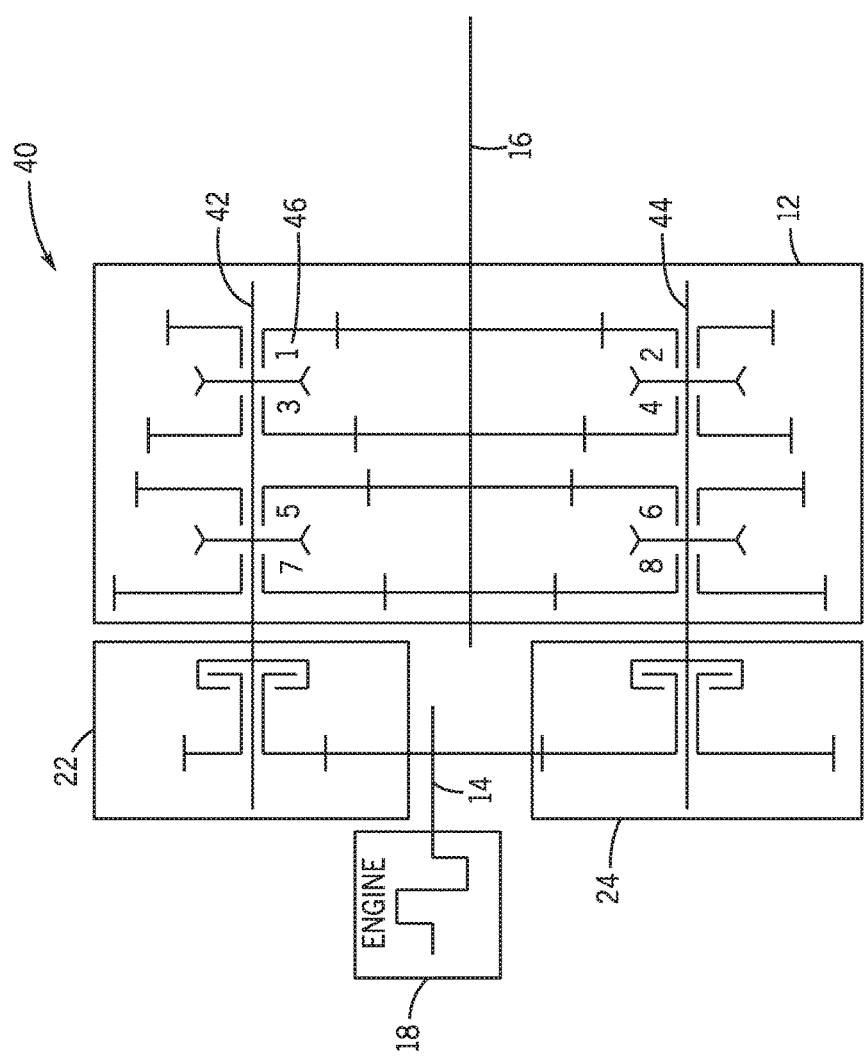
FIG. 2 is a schematic diagram of a portion of a transmission system in accordance with an embodiment of the present disclosure.

FIG. 2 is a schematic diagram of a portion 40 of the transmission system 10 of FIG. 1, in accordance with an embodiment of the present disclosure. The portion 40 includes the first clutch 22, the second clutch 24, and the transmission 12 of the transmission system 10. The engine 18 is coupled to the two clutches 22, 24 by the power input shaft 14 and provides power to rotate the power input shaft 14. Each clutch 22, 24 is coupled to the transmission 12 by a respective transmission shaft 42, 44. The illustrated transmission 12 has eight gears 46, first gear through eighth gear. In some embodiments, the transmission 12 may have more gears or fewer gears. In the illustrated embodiment, the first clutch 22 is coupled to a first transmission shaft 42 that drives odd-numbered gears. For example, the first transmission shaft 42 is coupled to the first, third, fifth, and seventh gears of the transmission 12. The second clutch 24 is coupled to a second transmission shaft 44 that drives even-numbered gears. For example, the second transmission shaft 44 is coupled to the second, fourth, sixth, and eighth gears of the transmission 12. The transmission 12 is coupled to the power output shaft 16 and is configured to transmit power from the power input shaft 14 to the power output shaft 16. It should be noted that other transmission, gear, and clutch configurations are contemplated, and that the illustrated embodiment is a non-limiting example.

With the foregoing in mind, FIG. 3 is a chart of torque paths 60 of the transmission system 10 in accordance with an embodiment of the present disclosure. In the illustrated embodiment, the transmission 12 has eight gear ratios, first gear through eighth gear. In some embodiments, the transmission 12 may have more gear ratios or fewer gear ratios. For each selected gear ratio 62, the chart shows the corresponding torque path 60 through a main clutch 64 and a helper clutch 66. The helper clutch 66 is utilized in cases in which the vehicle (e.g., the tractor) starts from rest with a load or shuttle-shifts (i.e., shifts between a forward gear and a reverse gear). The main clutch 64 may be engaged to facilitate selection of a desired gear ratio 62, and the helper clutch 66 may be engaged to reduce the power dissipated by the main clutch 64. In some embodiments, a corresponding gear of a shaft associated with the helper clutch 66 may not exceed a 1:1.2 ratio compared to the selected gear on a shaft associated with the main clutch 64. In some embodiments, the corresponding gear of the shaft associated with the helper clutch 66 may not exceed a 1:1.3 ratio compared to the selected gear on the shaft associated with the main clutch 64. For example, the main clutch 64 may be engaged while one gear 68 on the shaft associated with the main clutch 64 is selected, and the helper clutch 66 may be engaged while an immediately lower gear on the shaft associated with the helper clutch 66 is selected (unless the main clutch 64 is engaged while the first gear is selected, wherein the helper clutch 66 may be engaged while an immediately higher gear, i.e., the second gear, is selected). In some embodiments, the corresponding gear of the shaft associated with the helper clutch 66 may be an immediately lower gear compared to the selected gear on the shaft associated with the main clutch 64. In some embodiments, the corresponding gear of the shaft associated with the helper clutch 66 may be an immediately higher gear (such as in the case where the main clutch 64 is engaged while the first gear is selected). At certain times, the first clutch 22 may function as the main clutch 64 and the second clutch 24 may function as the helper clutch 66. At other times, the second clutch 24 may function as the main clutch 64 and the first clutch 22 may function as the helper clutch 66. The chart identifies, for each selected gear ratio 62, when the first clutch 22 and the second clutch 24 function as the main clutch 64 and the helper clutch 66. Additionally, the chart identifies which gears 68 are engaged on the shafts associated with the main clutch and the helper clutch for each gear ratio 62, and which clutch functions as the main clutch 64 and which clutch functions as the helper clutch 66.

For example, when the first gear ratio is selected 62 by the operator, the torque path includes the first clutch 22 acting as the main clutch 64 and the second clutch 24 acting as the helper clutch 66, wherein the first gear 68 is engaged on the shaft associated with the main clutch 64, and the second gear 68 is engaged on the shaft associated with the helper clutch 66. As another example, when the fourth gear ratio is selected 62 by the operator, the torque path includes the second clutch 24 acting as the main clutch 64 and the first clutch 22 acting as the helper clutch 66, wherein the fourth gear is engaged 68 on the shaft associated with the main clutch 64 and the third gear is engaged 68 on the shaft associated with the helper clutch 66. It should be noted that other torque paths and gear and clutch configurations are contemplated, and that the torque paths in the chart in FIG. 3 are non-limiting examples.

Slipping the main clutch 64 and the helper clutch 66 in parallel torque paths may facilitate power dissipation of the clutches 64, 66 to be shared and peak power dissipation to be reduced compared to using a single clutch. For example, shared power dissipation may be achieved by controlling both the torque delivered by the main clutch 64 to the selected gear 68 on the shaft associated with the main clutch 64 and the torque delivered by the helper clutch 66 to the selected gear 68 on the shaft associate with the helper clutch 66. The torque delivered by the two clutches 64, 66 may be controlled by splitting the power dissipation approximately equally between the two clutches 64, 66 when slippage is high (e.g., when the clutches 64, 66 begin to engage). As the main clutch 64 approaches lock-up (e.g., when the main clutch 64 is completely engaged), the torque balance between the two clutches 64, 66 is modified based on a ratio of transmission output speed to transmission input speed such that a seamless transition to a fully engaged main clutch 64 and a fully disengaged helper clutch 66 is provided. The transmission input speed is a speed of the power input shaft 14. For example, the transmission input speed may be determined based on engine speed, a speed determined from the engine speed, the rotation speed of the power input shaft 14, or any combination thereof. In certain embodiments, the transmission input speed may be received or determined at the controller 20 based at least in part on the input speed sensor 26. The transmission output speed is the speed of the output power shaft 16. For example, the transmission output speed may be determined based on the rotation speed of the power output shaft 16, the speed of an intermediate portion of the transmission 12 (e.g., an intermediate speed within the transmission 12), or any combination thereof. The transmission output speed may also be determined based at least in part on gear ratios of the transmission 12. The transmission output speed may be a received or determined at the controller 20 based at least in part on the output speed sensor 28.

Figure 4:
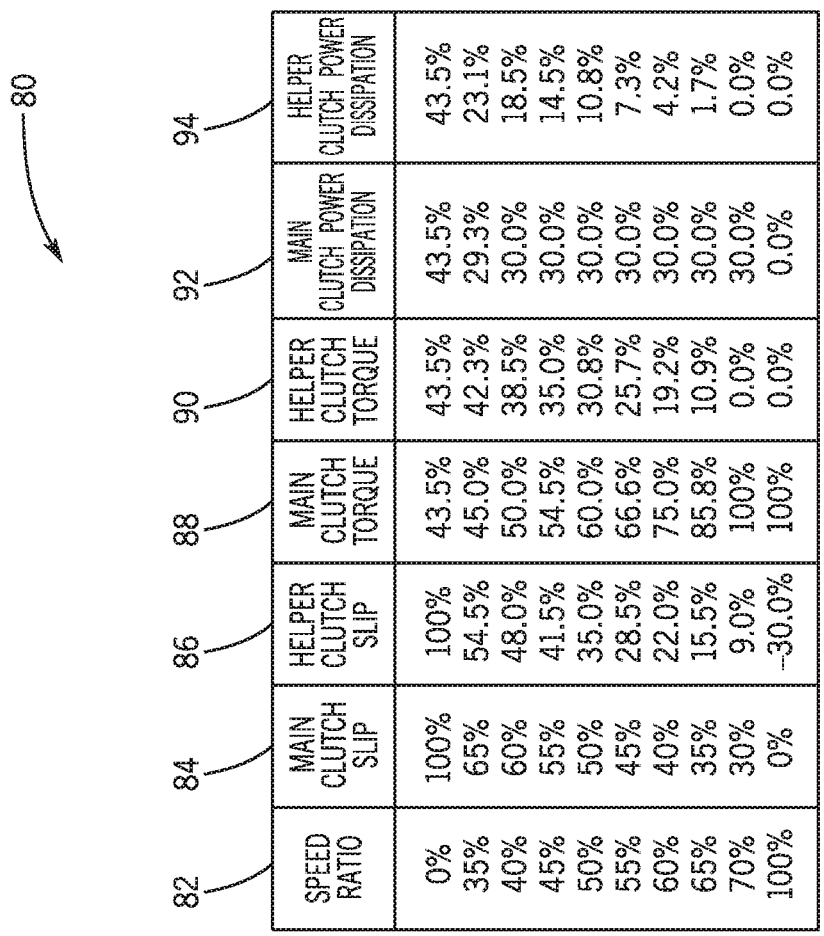
FIG. 4 is a chart of torque balance among and power dissipated by two clutches of a transmission system in accordance with an embodiment of the present disclosure.

With the foregoing in mind, FIG. 4 is a chart 80 of torque balance among and power dissipated by the main clutch 64 and the helper clutch 66 as a function of a speed ratio 82 in accordance with an embodiment of the present disclosure. The speed ratio 82 is a ratio (that may be expressed as a percentage) of a measured ratio of transmission output speed to transmission input speed to a determined ratio of transmission output speed to transmission input speed. The determined ratio is a ratio that is achieved when the main clutch 64 is fully engaged in the selected gear 68. When the speed ratio 82 is 0 percent, the transmission 12 is transferring no power from the power input shaft 14 to the power output shaft 16 because the main clutch 64 and the helper clutch 66 are not engaged and/or the power output shaft 16 is stopped. This may occur, for example, as the clutches 64, 66 begin to engage. Accordingly, the slip 84 of the main clutch 64 and the slip 86 of the helper clutch 66 are both at 100 percent.

In accordance with an embodiment of the present disclosure, when the speed ratio 82 is 0 percent and the slip 84 of the main clutch 64 and the slip 86 of the helper clutch 66 are both at 100 percent, the controller 20 may distribute an input torque from an input shaft of the transmission 12 equally 88, 90 among the main clutch 64 and the helper clutch 66. It may be desired that the main clutch 64 and the helper clutch 66 provide 100 percent of the output torque of a single clutch (e.g., if the main clutch 64 was used alone). Due to the difference in gear ratios between the gear ratio of the gears associated with the main clutch 64 and the gear ratio of the gears associated with the helper clutch 66, the output torque provided by each clutch may not be equal. For example, the ratio of the gear ratio associated with the main clutch 64 to the gear ratio associated with the helper clutch 66 may be 1:1.3. As such, the gears associated with the helper clutch 66 multiplies the input torque 1.3 times as much as the gears associated with the main clutch 64. Given the difference in gear ratios and the target of distributing the input torque equally, the main clutch 64 and the helper clutch 66 may provide (per FIG. 4) approximately 43.5 percent and 56.5 percent of the output torque of a single clutch (e.g., if the main clutch 64 was used alone), respectively (such that the total output torque is 100 percent). To achieve this output torque apportionment, the controller 20 may distribute the input torque to the main clutch 64 and to the helper clutch 66 such that the torque each clutch receives from the input shaft is 43.5 percent of the torque that would be received by the main clutch 64 if the main clutch 64 was used alone. Similar calculations may be performed for any difference in gear ratio between gears associated with the main clutch 64 and gears associated with the helper clutch 66, as well as any distribution of the input torque from the input shaft of the transmission 12.

As another example, when the speed ratio 82 is 50 percent and the slip 84 of the main clutch 64 is at 50 percent and the slip 86 of the helper clutch 66 is at 35 percent, the controller 20 may distribute the input torque form the input shaft of the transmission 12 such that 60 percent of the torque that would be received by the main clutch 64 if the main clutch 64 was used alone is apportioned 88 to the main clutch 64 and 30.8 percent is apportioned 90 to the helper clutch 66. Again, assuming that the ratio of the gear ratio associated with the main clutch 64 to the gear ratio associated with the helper clutch 66 is 1:1.3, the main clutch 64 and the helper clutch 66 may provide (per FIG. 4) approximately 60 percent and 40 percent of the output torque of a single clutch (e.g., if the main clutch 64 was used alone), respectively (such that the total output torque is 100 percent). These torque percentages may be stored in the memory device 34 in the form of, for example, look up tables, and accessed by the controller 20. The controller 20 may determine a total output torque or a total input torque (e.g. a total torque command) to be controlled by the combination of the main clutch 64 and the helper clutch 66 based on receiving an input signal from the user interface 32, such as from a clutch pedal.

The controller 20 controls the amount of torque 88, 90 transferred through the main clutch 64 and the helper clutch 66 by sending signals, such as outputting signals indicative of torque commands to a clutch assembly. The clutch assembly may be a component of the transmission 12 or coupled to the transmission 12. The clutch assembly may include one or more clutches (e.g., the main clutch 64 and the helper clutch 66). In some embodiments, the clutch assembly may include one or more solenoids, wherein the one or more solenoids may control the one or more clutches of the transmission 12. For example, the processor 33 may send a signal to the one or more solenoids of the clutch assembly indicative of the torque command. The one or more solenoids may control the one or more clutches of the transmission, including the main clutch 64 and the helper clutch 66, to apply a torque as indicated by the torque command. In some embodiments, the clutch assembly may include a clutch assembly controller. For example, the processor 33 may send a signal to the clutch assembly controller to indicative of the torque command. The clutch assembly controller may control the one or more clutches of the transmission, including the main clutch 64 and the helper clutch 66, to apply a torque as indicated by the torque command.

Because the input torque is distributed equally among the main clutch 64 and the helper clutch 66, the power dissipation is also distributed equally among the main clutch 64 and the helper clutch 66. For example, to achieve a certain output torque, the power dissipated 92 by the main clutch 64 may be approximately 43.5 percent of a power dissipated by the main clutch 64 if only the main clutch 64 was used and the power dissipated 94 by the helper clutch 66 may be approximately 43.5 percent of the power dissipated by the helper clutch 66 if only the helper clutch 66 was used. The total power dissipated is less than the power dissipated by the main clutch 64 if only the main clutch 64 was used because the helper clutch is providing output torque through a more advantageous gear ratio.

As the speed ratio 82 increases (i.e., the main clutch 64 approaches lock-up), the controller 20 may transition the torque from the helper clutch 66 to the main clutch 64. For example, when the speed ratio 82 is approximately 50 percent, the controller 20 may control the main clutch 64, such that the torque 88 transferred through the main clutch 64 is approximately 60 percent of the torque that would be transferred through the main clutch 64 if only the main clutch 64 were used. The controller 20 may also control the helper clutch 66, such that the input torque transferred through the helper clutch 90 is approximately 30.8 percent of the input torque that would drive the main clutch 64 if only the main clutch 64 were used. These torque percentages may be stored in the memory device 34 in the form of, for example, look up tables, and accessed by the controller 20. The controller 20 controls the amount of torque 88, 90 transferred through the main clutch 64 and the helper clutch 66 by sending signals indicative of torque commands to a clutch assembly of the transmission 12. As a result, the power dissipated 92 by the main clutch 64 may be increasingly greater than the power dissipated 94 by the helper clutch 66. For example, the power dissipated 92 by the main clutch 64 may be approximately 30 percent of the total power of a power that would be dissipated by the main clutch 64 if only the main clutch 64 were used and the power dissipated 94 by the helper clutch 66 may be approximately 10.8 percent of a power that would be dissipated by the main clutch 64 if only the main clutch 64 were used. When the speed ratio 82 reaches approximately 70 percent, the controller 20 may control the helper clutch 66, such that torque 90 is no longer transferred through the helper clutch 66. For example, when the speed ratio 82 is approximately 70 percent, the controller 20 may control the main clutch 64, such that the torque 88 transferred through the main clutch 64 is 100 percent of the torque that would be transferred through the main clutch 64 if only the main clutch 64 were used. The controller 20 may also control the helper clutch 66, such that the torque 90 transferred through the helper clutch 66 is zero. It should be noted that the controller 20 may control the helper clutch 66 such that the torque 90 transferred through the helper clutch 66 is approximately zero when the speed ratio reaches approximately 70 percent. In some embodiments, the controller 20 may do so to prevent the helper clutch 66 from transitioning from driving to braking. As such, the speed ratio above which the helper clutch 66 transfers approximately zero torque may be dependent upon a ratio between the main clutch torque 88 path ratio and the helper clutch 90 torque path ratio. These torque percentages may be stored in the memory device 34 in the form of, for example, look up tables, and accessed by the controller 20. As a result, the power dissipated 92 by the main clutch 64 may be approximately 30 percent of the total power provided by the power input shaft 14. The power dissipated 94 by the helper clutch 66 may be approximately zero. It should be noted that other torque percentages for the main clutch 64 and helper clutch 66 are contemplated in which the controller 20 transitions the torque from the helper clutch 66 to the main clutch 64.

Figure 5:
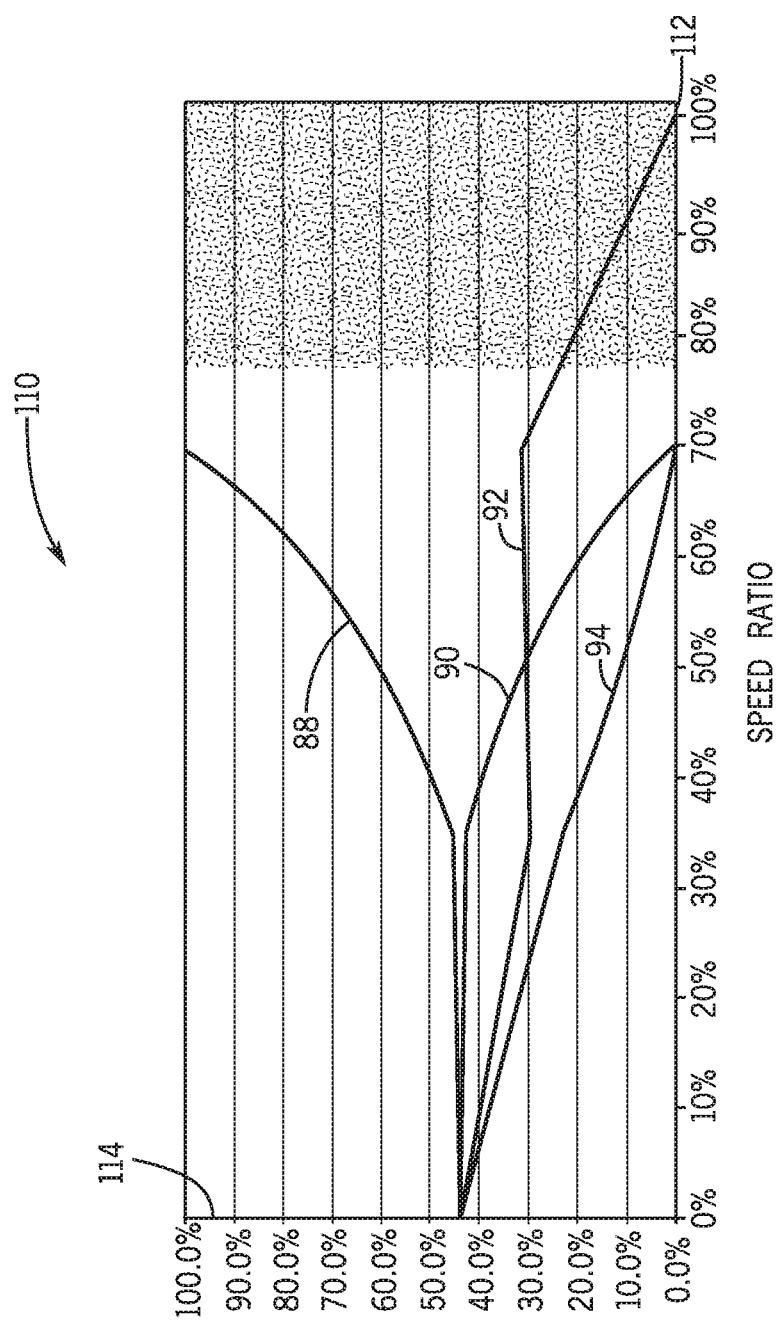
FIG. 5 is a graph of torque balance among and power dissipated by two clutches of a transmission system in accordance with an embodiment of the present disclosure.

FIG. 5 is a graph 110 of the torque balance among and power dissipated by the main clutch 64 and the helper clutch 66 as a function of the speed ratio 82, in accordance with an embodiment of the present disclosure. The horizontal axis 112 of the graph 110 represents the speed ratio 82, and the vertical axis 114 of the graph 110 represents the percentage of the input torque that would be used to achieve the desired output torque if only the main clutch 64 were used, that is transferred through the main clutch 64 and the helper clutch 66 by the controller 20 and power dissipated by the main clutch 64 and the helper clutch 66. The four curves represent the torque 88 transferred through the main clutch 64, the torque 90 transferred through the helper clutch 66, the power dissipated 92 by the main clutch 64, and the power dissipated 94 by the helper clutch 66. As shown by the four curves, when the speed ratio 82 is 0 percent (e.g., when the clutches 64, 66 begin to engage), the controller 20 may distribute the torque equally among the main clutch 64 and the helper clutch 66. The controller 20 may control the main clutch 64 and the helper clutch 66 by sending signals indicative of torque commands to a clutch assembly of the transmission 12. Because the torque is distributed equally among the main clutch 64 and the helper clutch 66, the power dissipated 92 by the main clutch 64 is equal to the power dissipated 94 by the helper clutch 66. As the speed ratio 82 increases (i.e., the main clutch 64 approaches lock-up), the controller 20 may transition the torque from the helper clutch 66 to the main clutch 64. As a result, the power dissipated 92 by the main clutch 64 may be increasingly greater than the power dissipated 94 by the helper clutch 66. When the speed ratio 82 reaches approximately 70 percent, the controller 20 may control the helper clutch 66, such that the torque 90 transferred through the helper clutch 66 is zero. The graph shows that by controlling both the torque 88 transferred through the main clutch 64 and the torque 90 transferred through the helper clutch 66, power dissipation of the clutches 64, 66 may be shared, thereby reducing peak power dissipation compared to using a single clutch. In addition, a transition from transferring torque through both the main clutch 64 and the helper clutch 66 to transferring torque through only the main clutch 64 is accomplished without a torque reversal or any sudden changes in torque through either of the main clutch 64 and the helper clutch 66.

Figure 6:
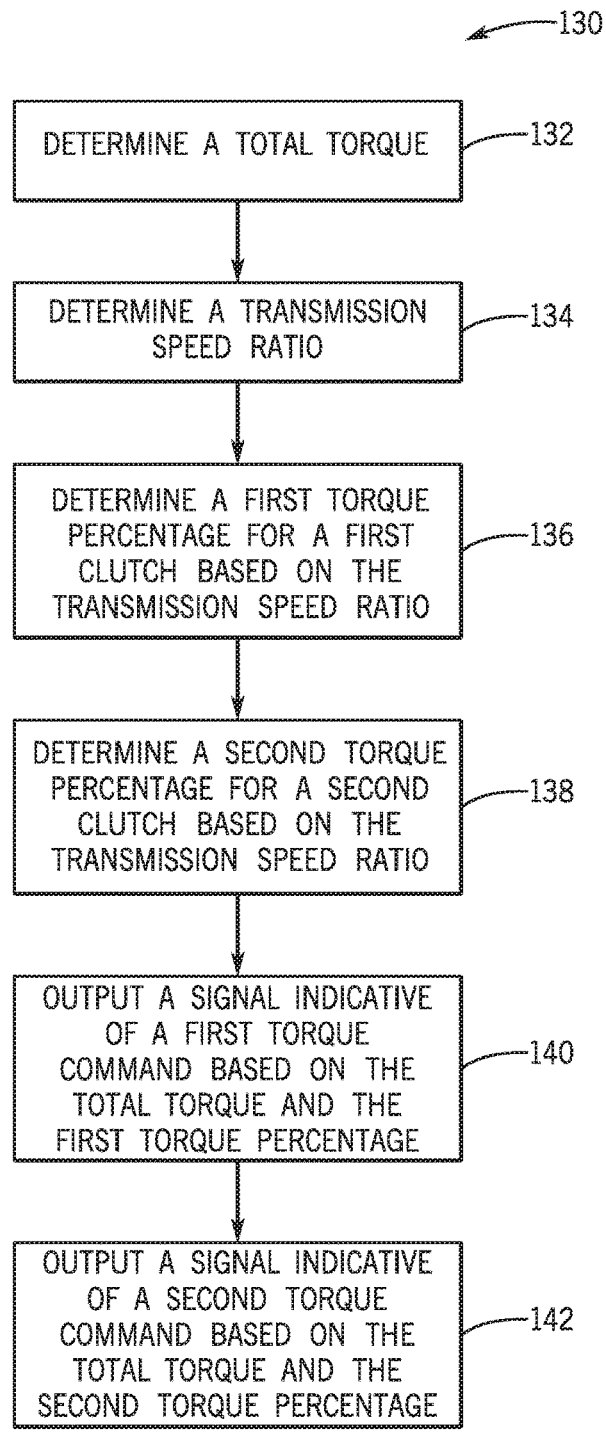
FIG. 6 is a flowchart of a method for controlling two clutches of a transmission system in accordance with an embodiment of the present disclosure.

FIG. 6 is a flowchart of a method 130 for controlling the two clutches 64, 66 of the transmission system 10 in accordance with an embodiment of the present disclosure. The controller 20 determines (block 132) a total torque (e.g. a total torque command) for the main clutch 64 and the helper clutch 66 based on receiving input signals from the user interface 32, such as from a clutch pedal. The controller 20 then determines (block 134) a speed ratio 82. The speed ratio 82 is a ratio or percentage of a measured ratio of transmission output speed to transmission input speed to a determined ratio of transmission output speed to transmission input speed. The determined ratio is a ratio that is achieved when the main clutch 64 is fully engaged in the selected gear 68. The speed ratio 82 may also be determined by subtracting a slip percentage of the main clutch from 100 percent. The transmission input speed is a speed of the power input shaft 14. For example, the transmission input speed may be determined based on the engine speed, a speed determined from the engine speed, the measured rotation speed of the power input shaft 14 (e.g., based on a signal from the input speed sensor 26), or any combination thereof. The transmission output speed is a speed of the power output shaft 16. For example, the transmission output speed may be determined based on the measured rotation speed of the power output shaft 16, the speed of an intermediate portion of the transmission 12 (e.g., an intermediate speed within the transmission 12), or any combination thereof. The transmission output speed may also be determined based at least in part on gear ratios of the transmission 12.

The controller 20 determines (block 136) a first torque percentage for a first clutch based on the speed ratio 82. The controller 20 also determines (block 138) a second torque percentage for a second clutch based on the transmission speed ratio. These torque percentages may be stored in the memory device 34 in the form of, for example, look up tables, and accessed by the processor 33 of the controller 20. The controller 20 then outputs (block 140) a signal indicative of a first torque command to a clutch assembly of the transmission 12 based on the total torque and the first torque percentage. The controller 20 also outputs (block 142) a signal indicative of a second torque command to a clutch assembly of the transmission 12 based on the total torque and the second torque percentage.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method, comprising:
   determining, via a processor, a speed ratio of a transmission system comprising a transmission based at least in part on an output speed of the transmission system and an input speed of the transmission system;
   determining, via the processor, a first torque percentage for a first clutch coupled to the transmission based at least in part on the speed ratio;
   determining, via the processor, a second torque percentage for a second clutch coupled to the transmission based at least in part on the speed ratio;
   outputting, via the processor, a signal indicative of a first torque command to a clutch assembly based at least in part on the first torque percentage; and outputting, via the processor, a signal indicative of a second torque command to the clutch assembly based at least in part on the second torque percentage,
wherein a first power dissipated by the first clutch and a second power dissipated by the second clutch are approximately equal when the speed ratio is zero.

2. The method of claim 1, comprising determining, via the processor, a total torque command for the first clutch and the second clutch.

3. The method of claim 2, wherein outputting, via the processor, the signal indicative of the first torque command to the clutch assembly is based at least in part on the total torque command; and wherein outputting, via the processor, the signal indicative of the second torque command to the clutch assembly is based at least in part on the total torque command.

4. The method of claim 2, comprising determining the total torque command based at least in part on a position of a clutch pedal.

5. The method of claim 1, comprising determining the output speed of the transmission system based at least in part on an intermediate speed within the transmission.

6. The method of claim 5, comprising determining the output speed of the transmission system is based at least in part on a signal received from a speed sensor, wherein the speed sensor is configured to determine the intermediate speed within the transmission or the output speed of the transmission system.

7. The method of claim 1, wherein the input speed of the transmission system is based at least in part on a speed of an engine.

8. The method of claim 1, wherein when the speed ratio of the transmission system is greater than zero, the first power dissipated by the first clutch is lower than when the speed ratio is zero, and the second power dissipated by the second clutch is lower than when the speed ratio is zero.

9. A method, comprising:
determining, via a processor, a speed ratio of a transmission system comprising a transmission based at least in part on an output speed of the transmission system and an input speed of the transmission system;
determining, via the processor, a first torque percentage for a first clutch coupled to the transmission based at least in part on the speed ratio;
determining, via the processor, a second torque percentage for a second clutch coupled to the transmission based at least in part on the speed ratio;
outputting, via the processor, a signal indicative of a first torque command to a clutch assembly based at least in part on the first torque percentage;
outputting, via the processor, a signal indicative of a second torque command to the clutch assembly based at least in part on the second torque percentage; and
determining, via the processor, a total torque command for the first clutch and the second clutch, wherein outputting, via the processor, the signal indicative of the first torque command to the clutch assembly is based at least in part on the total torque command, and wherein outputting, via the processor, the signal indicative of the second torque command to the clutch assembly is based at least in part on the total torque command,
wherein the first torque command comprises multiplying the total torque command by the first torque percentage; and wherein the second torque command comprises multiplying the total torque command by the second torque percentage.

10. A system for controlling a transmission system, comprising:
a controller configured to control a first torque through a first clutch coupled to a transmission and a second torque through a second clutch coupled to the transmission, wherein:
the controller is configured to control the first torque and the second torque such that a first power dissipation of the first clutch is approximately equal to a second power dissipation of the second clutch when a speed ratio is zero, wherein the speed ratio comprises a ratio of a measured ratio of a speed of an output shaft of the transmission to a speed of an input shaft of the transmission to a determined ratio of the speed of the output shaft of the transmission to the speed of the input shaft of the transmission when the first clutch is fully engaged; and
the controller is configured to adjust the first torque and the second torque based at least in part on the speed ratio as the first slippage of the first clutch and the second slippage of the second clutch changes.

11. The system of claim 10, wherein the first torque increases or remains constant and the second torque decreases or remains constant as the speed ratio increases.

12. The system of claim 10, wherein the controller is configured to determine the speed of the input shaft of the transmission based at least in part from a signal from an input speed sensor.

13. The system of claim 10, wherein the controller is configured to determine the speed of the output shaft of the transmission based at least in part from a signal from an output speed sensor.

14. The system of claim 10, wherein the controller is configured to determine a total torque for the first clutch and the second clutch.

15. A transmission system, comprising
a transmission;
a clutch assembly coupled to the transmission, wherein the clutch assembly comprises a main clutch and a helper clutch; and
a controller communicatively coupled to the main clutch and to the helper clutch, wherein the controller is configured to:
determine a speed ratio comprising a ratio of a measured ratio of a speed of an output shaft of the transmission to a speed of an input shaft of the transmission to a determined ratio of the speed of the output shaft of the transmission to the speed of the input shaft of the transmission when the main clutch is fully engaged;
determine a first torque percentage for the main clutch based at least in part on the speed ratio;
determine a second torque percentage for the helper clutch based at least in part on the speed ratio;
determine a first torque command based at least in part on the first torque percentage;
determine a second torque command based at least in part on the second torque percentage;
control a first torque through the main clutch of the clutch assembly based at least in part on the first torque command; and
control a second torque through the helper clutch of the clutch assembly based at least in part on the second torque command,
wherein the first torque percentage increases or remains constant and the second torque percentage decreases or remains constant as the speed ratio increases.

16. The transmission system of claim 15, wherein the clutch assembly comprises one or more solenoids, wherein the one or more solenoids controls the main clutch and the helper clutch.

17. The transmission system of claim 15, wherein the clutch assembly comprises a clutch assembly controller, wherein the clutch assembly controller controls the main clutch and the helper clutch.

18. The transmission system of claim 15, wherein determining the first torque percentage and determining the second torque percentage comprises referencing a look up table.

* * * * *